United States Patent
McGill et al.

(10) Patent No.: US 11,451,932 B1
(45) Date of Patent: Sep. 20, 2022

(54) INITIATING COMMUNICATION BASED ON A DEVICE LOCATION-INDEPENDENT LOCATION TRIGGER

(71) Applicant: Capital One Services, LLC, McLean, VA (US)

(72) Inventors: Brian McGill, McLean, VA (US); Micah Price, McLean, VA (US); Krista Rister, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/225,360

(22) Filed: Apr. 8, 2021

(51) Int. Cl.
*H04W 8/24* (2009.01)
*H04W 16/08* (2009.01)
*H04W 4/029* (2018.01)
*H04W 60/04* (2009.01)
*H04W 4/50* (2018.01)
*H04W 76/10* (2018.01)
*H04W 48/16* (2009.01)
*G06F 9/455* (2018.01)
*H04W 36/22* (2009.01)

(52) U.S. Cl.
CPC ............ *H04W 4/029* (2018.02); *H04W 4/50* (2018.02); *H04W 60/04* (2013.01)

(58) Field of Classification Search
CPC ....... H04W 4/029; H04W 4/50; H04W 60/04; H04W 36/00; H04W 4/18
See application file for complete search history.

(56) References Cited

U.S. PATENT DOCUMENTS

| | | | | |
|---|---|---|---|---|
| 2013/0317944 A1* | 11/2013 | Huang | ............. | H04W 4/02 455/457 |
| 2015/0332325 A1* | 11/2015 | Sharma | ............. | G06Q 30/0259 705/14.57 |
| 2017/0064667 A1* | 3/2017 | Mycek | ............. | H04W 4/027 |
| 2018/0041868 A1* | 2/2018 | Gunnarsson | ....... | H04B 17/3911 |

* cited by examiner

Primary Examiner — Joshua L Schwartz
(74) Attorney, Agent, or Firm — Perkins Coie LLP (57) ABSTRACT

In certain embodiments, initiation of a location-triggered communication with a user may be facilitated. Communication may be initiated with a user (e.g., on a mobile device) based on an occurrence of a location trigger corresponding to a destination location at which the communication is to be initiated. The occurrence of the location trigger indicates the user is likely on the way to the destination location. The occurrence may be predicted based on mobile device location-independent user location information obtained from a data stream of a real-time application. For example, an event location and an event time of an event associated with the user may be extracted from the data stream and used to predict the occurrence.

20 Claims, 6 Drawing Sheets

INITIATING COMMUNICATION BASED ON A DEVICE LOCATION-INDEPENDENT LOCATION TRIGGER

BACKGROUND

Some systems initiate communication with the user based on the user being available at a certain location (e.g., home of the user). These systems may use mobile device information, such as global positioning system (GPS) data from a mobile device, to determine the location of the user. Due to privacy-related concerns, however, such device information may not be shared by users or otherwise accessible for communication purposes. Accordingly, without such mobile device location information, current systems may not be able to employ location-triggered communication with users. These and other drawbacks exist.

SUMMARY

Aspects of the invention relate to systems and methods for facilitating initiation of a location-triggered communication with a user based on a predicted occurrence of a mobile device location-independent location trigger.

In some embodiments, communication may be initiated with a user (e.g., on a mobile device of the user) based on an occurrence of a location trigger corresponding to a destination location at which the communication is to be initiated. The occurrence of the location trigger may be indicative of an availability of a user at the destination location for initiating the communication. As an example, a data stream of an application (e.g., a real-time application) may be monitored, and event information independent of the user's mobile device location information may be extracted from the data stream. The occurrence may be predicted based on mobile device location-independent user location information extracted from a data stream of a real-time application. The data stream may include data items in which each data item indicates an event location of an event associated with the user, an event time associated with the event location, or other information. For example, a data item may include transaction related information of the user, such as transaction location and a transaction time of a transaction associated with the user received from a transaction computer system. The transaction location and the transaction time may be used to predict a time associated with the location trigger (e.g., a time at which, or a timeframe during which, the user is likely to be available at the destination location for initiating a communication with the user). In this way, for example, location-triggered communication may be performed without the use of device location information from a mobile device of the user.

In some embodiments, the communication may be initiated with the user (e.g., on a mobile device of the user) based on a current time overlapping with the predicted time. In some embodiments, the initiation of communication with the user may be automatically queued in a communication queue and the communication may be initiated by selecting the next user in the queue. For example, information (e.g., username and contact information) and time for initiating the communication with the next user in the queue may be displayed on a computer system to a representative, who may then initiate the communication with the user.

The occurrence of the location trigger may be determined based on the data items in various ways, for example, based on specified criteria/rules/policies set by the user or based on a prediction model. In some embodiments, training information may be provided as input to a prediction model to generate prediction data related to an occurrence of a location trigger corresponding to a destination location. As an example, the training information may indicate (a) an event location, (b) an event time, (c) event type, or such other information with respect to a number of events associated with the user. The prediction model may generate prediction data related to an occurrence of a location trigger corresponding to the destination location (e.g., whether the first transaction was performed by the user on the way to destination location from the event location) based on the above training information. In some embodiments, actual event information (e.g., whether the location trigger occurred for each of the events in the training information) may be provided as reference feedback to the prediction model. As an example, the training information may include a label indicating that the user performed the first transaction on the way to the destination location. The prediction model may update one or more portions of the prediction model based on the predictions and the reference feedback information. Subsequent to the updating of the prediction model, the prediction model may be used to process the data items to determine an occurrence of a location trigger corresponding to a destination location.

Various other aspects, features, and advantages of the inventions will be apparent through the detailed description of the invention and the drawings attached hereto. It is also to be understood that both the foregoing general description and the following detailed description are exemplary and not restrictive of the scope of the inventions. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
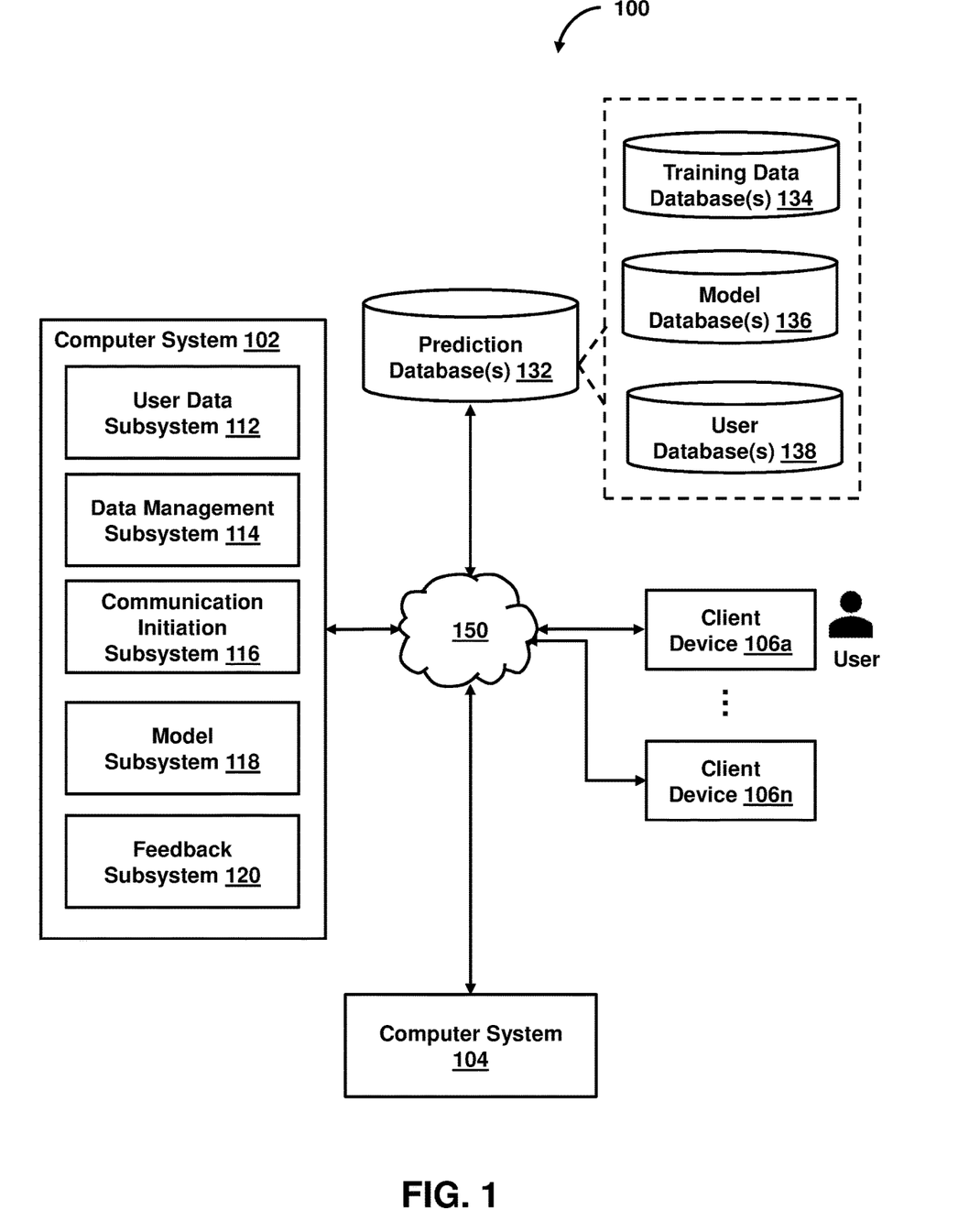
FIG. 1 shows a system for facilitating location-triggered communication initiation, in accordance with one or more embodiments.

FIG. 1 shows a system 100 for facilitating location-triggered communication initiation, in accordance with one or more embodiments. As shown in FIG. 1, system 100 may include computer system 102, computer system 104, client device 106 (or client devices 106a-106n), or other components. By the way of example, computer system 102 and the computer system 104 may include any computing device, such as a personal computer (PC), a laptop computer, a tablet computer, a hand-held computer, or other computer equipment. Computer system 102 may include user data subsystem 112, data management subsystem 114, communication initiation subsystem 116, model subsystem 118, feedback subsystem 120, or other components. Each client device 106 may include any type of mobile terminal, fixed terminal, or other device. By way of example, client device 106 may include a desktop computer, a notebook computer, a tablet computer, a smartphone, a wearable device, or other client device. Users may, for instance, utilize one or more client devices 106 to interact with one another, one or more servers, or other components of system 100.

A component of system 100 may communicate with one or more components of system 100 via a communication network 150 (e.g., Internet, a mobile phone network, a mobile voice or data network, a cable network, a public switched telephone network, or other types of communications network or combinations of communications networks). The communication network 150 may be a wireless or wired network. As an example, the computer system 104 may interact with the computer system 102 via the above described communication network. As another example, the client device 106 and the computer system 102 may communicate wirelessly.

It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 106 or components of computer system 104.

It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 predicts an occurrence of a location trigger corresponding to a destination location and initiates communication with a user (e.g., initiates a call to the client device 106a associated with the user) based on the predicted occurrence of the location trigger. The predicted occurrence of the location trigger may indicate that the user may be available at the destination location at a specified time or timeframe. In some embodiments, system 100 predicts an occurrence of a location trigger based on data items having mobile device location-independent location information related to the user. As an example, a data item may include any event information, such as activity information related to the user. The activity information may include an activity location of an activity performed by the user, activity time associated with the activity location, or other such information. In some embodiments, system 100 may extract the data items from a data stream of a real-time application. For example, the real-time application may facilitate obtaining of the activity information from the computer system 104 associated with an entity where the user performs the activity.

System 100 may predict, based on the data item, whether a location trigger corresponding to a destination location has occurred. As an example, the system 100 may predict that the location trigger has occurred based on a determination that the user has performed the activity on the way to the destination location (e.g., a home of the user) or the user would be available at the destination location in a specified time from the activity time indicated in the data item. The system 100 may determine the occurrence of the location trigger in various ways. In some embodiments, the system 100 may determine the occurrence based on specified criteria/rules/policies defined by an entity associated with the computer system 102. For example, the system 100 may analyze historical data related to user availability at the destination location and the activities performed by the user, and determine based on specified criteria/rules/policies that the user was available at the destination location after performing activities of certain type, at certain locations or at certain times.

In some embodiments, the system 100 may train a prediction model to determine the occurrence of the location trigger. System 100 may obtain data items associated with the user and input them as training information to a prediction model to generate prediction data related to an occurrence of the location trigger. As an example, the training information may indicate (a) an activity location, (b) an activity time, (c) an activity type, or such other information with respect to a number of activities associated with the user. The prediction model may generate prediction data related to an occurrence of the location trigger corresponding to the destination location based on the above training information. For example, the prediction data may be indicative of whether a first activity associated with a first activity location was performed by the user on the way to the destination location or whether the user is likely to be available at the destination location after performing the first activity. In some embodiments, actual event information such as whether the location trigger occurred (e.g., whether the first activity was performed by the user on the way to destination location from the activity location) for each of the data items in the training information may be provided as reference feedback to the prediction model. As an example, the reference feedback may indicate that the user performed the first activity on the way to the destination location. In some embodiments, the prediction model may also predict a time or timeframe during which the user would be available at the destination location. As an example, the training data may include time related information such as travel time to the destination location from an activity location or an actual time or timeframe during which the user was available at the destination location after performing the activity at the activity location. The prediction model may update one or more portions of the prediction model based on the prediction data and the reference feedback information. In this way, for example, the prediction model may be trained or configured to generate more accurate predictions.

As such, in some embodiments, subsequent to the updating of the prediction model, system 100 may use the prediction model to process the data items to predict an occurrence of a location trigger corresponding to a destination location. As an example, system 100 may obtain a data item (e.g., received from the computer system 104 in real-time, or from another source) and provide the data item to the prediction model to obtain a prediction related to an occurrence of a location trigger from the prediction model.

In some embodiments, the prediction model may include one or more neural networks, linear regression, tree based methods like random forest or gradient boosting machines (GBM), or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
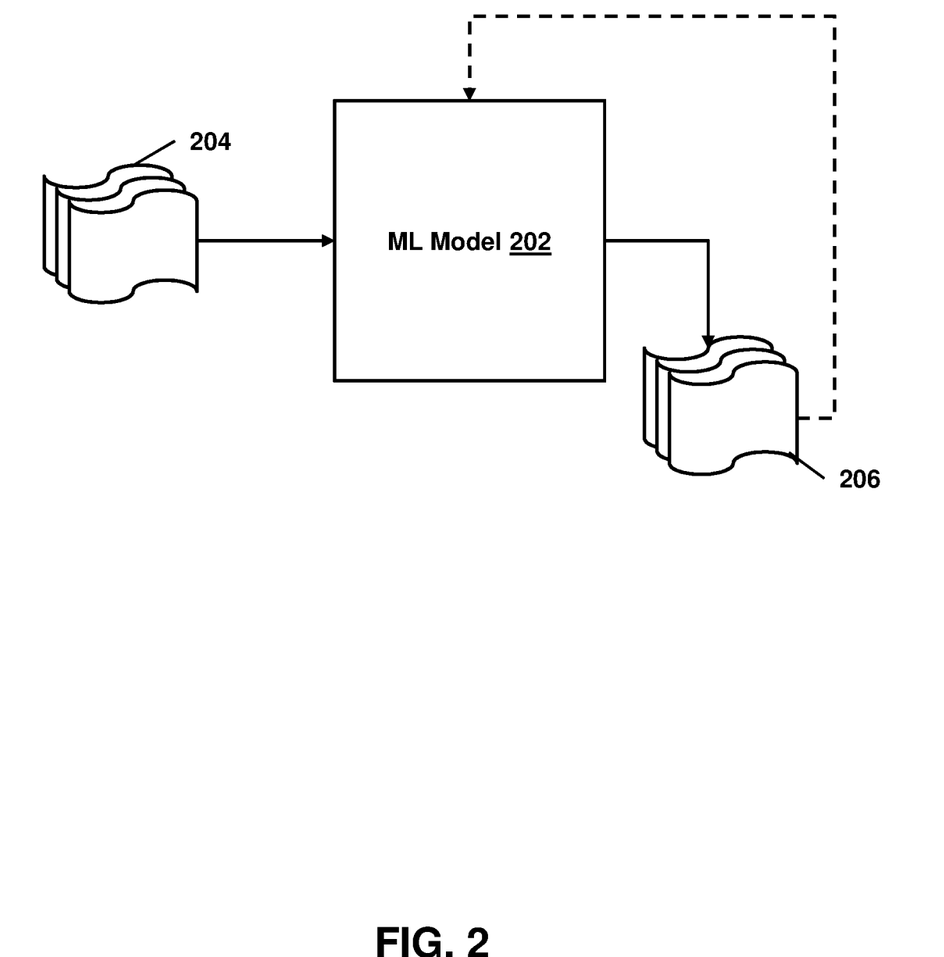
FIG. 2 shows a machine learning model configured to facilitate location-triggered communication initiation, in accordance with one or more embodiments.

As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

System 100 may use the predictions to determine a time associated with the location trigger (e.g., a time or time frame the user is available at the destination location for initiating the communication). As an example, based on the prediction data indicating an occurrence of the location trigger (e.g., prediction that the user likely performed a specified activity associated with a specified location on the way to the destination location), the system 100 may determine a time (e.g., or a time frame) the user is likely to be available at the destination location. In some embodiments, the time may be determined based on a specified activity time associated with the specified location and a travel time to the destination location from the specified location. For example, if the specified activity time is 5:30 PM and the travel time is determined to be at least "45" minutes, then the time associated the location trigger may be determined based on an estimated arrival time at the destination location, such as "6:15," "6:30," "6:40," "6:45," "6:30-6:45," or other times.

System 100 may facilitate initiating the communication with the user based on the determined time. System 100 may facilitate initiation of the communication with the user (e.g., on a mobile device of the user) based on a current time overlapping with the determined time. As an example, the initiation of communication may be automatically queued in a communication queue, and communication information (e.g., username, contact information, time for initiating the communication, or other such information) associated with the next user in the queue may be displayed on a computer system associated with a representative, who may then initiate the communication with the user.

In some embodiments, user data subsystem 112 facilitates management (e.g., adding, removing, or editing) of user profile data. The user profile data may include user related data such as a username, user contact information (e.g., telephone number, email ID, or other contact information), destination location information (e.g., home address), work location information (e.g., work address), or other such user related information. In some embodiments, the type of data included in the user profile data may depend on an entity associated with the computer system 102. For example, if the entity associated with the computer system 102 is a financial institution, then the user profile data may also include finance related data such as bank accounts, account balances, income information, or other such information. In some embodiments, the user data subsystem 112 may provide a graphical user interface (GUI) to the user for managing the user profile. In some embodiments, user data subsystem 112 stores the user profile data in user database 138.

Figure 3:
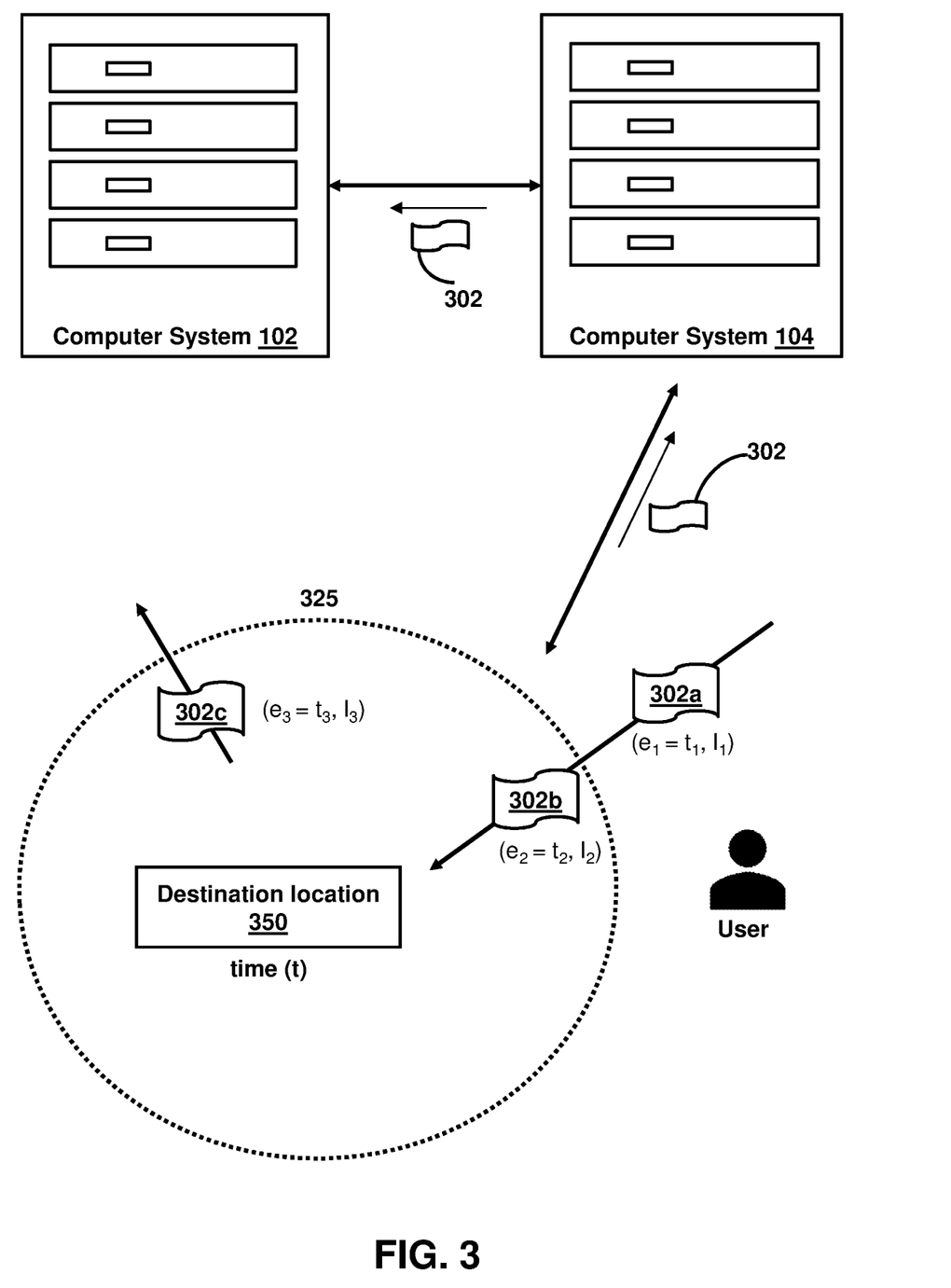
FIG. 3 shows a computer system obtaining data items having a mobile device location-independent location information of a user, in accordance with one or more embodiments.

In some embodiments, data management subsystem 114 manages data items related to the user. In some embodiments, a data item includes mobile device location-independent location information associated with the user. For example, as illustrated in FIG. 3, a data item 302a may include any event information, such as transaction information related to the user. The data item 302a, "$e_1$," may include a transaction location, "$l_1$," of a transaction performed by the user (e.g., at a merchant using a transaction token such as a credit card, debit card, a digital wallet, or other transaction token), transaction time, "$t_1$," associated with the transaction location, a transaction type (e.g., a merchant category such as groceries, gas, electronics, or other category), or other such information. In some embodiments, the transaction location may be the location associated with a merchant where the transaction is performed. For example, the transaction location, "$l_1$," in data item 302a may be an address or other location information associated with the merchant where the transaction is performed.

In some embodiments, the data management subsystem 114 may obtain the data items 302 (or data items 302a-302c) from a data feed associated with a real-time application. The real-time application may obtain the data items 302 from computer systems associated with the merchants where the user performs the transactions. For example, the real-time application may obtain the data items 302 from the computer system 104 associated with a merchant where the user performed the transactions. In some embodiments, the data management subsystem 114 obtains the data items 302 in real-time (e.g., as soon as a transaction is completed at the merchant, within a short period from the transaction time, such as "1" second, "2" seconds, "3" seconds, "3-5" seconds, or other such periods).

The data management subsystem 114 may provide the data items 302 to the communication initiation subsystem 116 for predicting an occurrence of a location trigger corresponding to a destination location 350. The data management subsystem 114 may provide all data items associated with the user to the communication initiation subsystem 116 for generating the predictions. In some embodiments, the data management subsystem 114 may select only those data items having transaction locations within a specified proximity 325 of the destination location 350 for generating the predictions. In some embodiments, only those transaction locations that are within the specified proximity 325 of the destination location 350 may be selected in order to improve the accuracy of the prediction as a transaction location closer to the destination location 350 is a more accurate predictor of the occurrence of the location trigger than a farther transaction location. By selecting only those data items having transaction locations within the specified proximity 325 of the destination location 350, the data management subsystem 114 may minimize the computing resources that may otherwise be consumed in generating the predictions. The specified proximity 325 may be defined by an entity associated with the computer system 102 (e.g., administrator or other entity). In some embodiments, the specified proximity may depend on the destination location 350. As an example, the specified proximity may be less if the destination location 350 is in a city compared to a destination location in a suburb.

In some embodiments, communication initiation subsystem 116 may facilitate generation of prediction data related to an occurrence of the location trigger corresponding to the destination location 350 at which a communication is to be initiated with the user. As described above, an occurrence of the location trigger corresponding to the destination location 350 may be indicative of the user performing the transaction on the way to the destination location 350 (e.g., a home of the user) or the user being available at the destination location 350 in a specified time from the transaction time indicated in the data item. The communication initiation subsystem 116 may be implemented in any of various configurations to generate the predictions. As an example, communication initiation subsystem 116 may be implemented as a rule-based system where a user (e.g., administrator of computer system 102 or another entity) may define rules for generating the prediction data. The rules may include destination location information (e.g., home address), transaction related information such as a transaction location, a transaction time associated with the transaction location, a transaction type (e.g., a merchant category such as groceries, gas, electronics, or other category), or other such information as criteria for determining the occurrence of the location trigger. For example, one rule may define that the location trigger has occurred when the transaction location, the transaction time and transaction type in a data item have satisfied a specified condition (e.g., data item 302b in which transaction location is within a specified proximity of the destination location 350, the transaction time is after "5:00 PM" and transaction type is groceries). In another example, a rule may define that the location trigger has occurred when multiple transactions are performed by the user within a specified period of time and the transaction location associated with the later transaction is closer to the destination location 350 than that of the earlier transaction (e.g., data items 302a and 302b corresponding to transactions "$e_1$" and "$e_2$," are received within "5" minutes, and the most recent transaction location, "$l_2$," is closer to the destination location 350 than the earlier transaction location "$l_1$"). In another example, a rule may define that the location trigger has not occurred when the transaction time satisfies a specified condition (e.g., data item 302c in which a transaction time, $t_3$, is between 8:00 AM and 9:00 AM). In some embodiments, a rule may be defined to determine a likelihood (e.g., as a percentage or other values) of the occurrence of the location trigger based on one or more conditions, and the communication initiation subsystem 116 may determine the location trigger has occurred if the likelihood satisfies a threshold value (e.g., exceeds the threshold value). Many such rules may be defined for predicting the occurrence of the location trigger.

As another example, the communication initiation subsystem 116 may use a prediction model to generate the prediction data. In some embodiments, a data item may be provided as input to the prediction model and the prediction model may generate the prediction data related to the occurrence of the location trigger based on a transaction location, transaction time, a transaction type, or other such information from the data item. In some embodiments, a collection of data items associated with the user may be obtained and input to the prediction model as training information to train the prediction model. Such information may be stored by computer system 102 in a storage system (e.g., training database 134). In some embodiments, the model subsystem 118 may obtain the training information from the training database 134 and provide it as input to a prediction model to generate the predictions. Feedback subsystem 120 may provide result information as reference feedback to the prediction model, and the prediction model may update its configurations (e.g., weights, biases, or other parameters) based on the predictions and the result information. In some embodiments, feedback subsystem 120 may provide the result information as reference feedback to the prediction model to cause the prediction model to assess its predictions against the result information. As an example, the prediction model may update its configurations (e.g., weights, biases, or other parameters) based on its assessment of the predictions. As an example, the predictions generated by the prediction model may be indicative of whether a location trigger corresponding to a destination location occurred (e.g., whether a first transaction associated with a first transaction location is performed by the user on the way to the destination location or whether the user is likely to be available at the destination location after performing the first transaction). In some embodiments, the result information may include actual data related to whether the location trigger occurred (e.g., actual data related to whether the first transaction was performed by the user on the way to destination location from the transaction location).

In some embodiments, subsequent to the updating of the prediction model, the prediction model may be used to predict an occurrence of a location trigger corresponding to a destination location. As an example, data items (e.g., received from the computer system 104 in real-time, or from another source) may be provided to the prediction model to obtain a prediction related to an occurrence of a location trigger corresponding to the destination location.

In some embodiments, the communication initiation subsystem 116 may facilitate determination of a time associated with the location trigger. As an example, the time associated with the location trigger may be a time, t, (e.g., or a time frame) the user is likely to be available at the destination location 350 for initiating the communication. The communication initiation subsystem 116 may determine the time, t, based on the prediction data indicating the occurrence of the location trigger (e.g., the user likely performed the transaction "$e_2$" corresponding to data item 302b at the transaction location, "$l_2$," on the way to the destination location 350). In some embodiments, the time, t, may be determined based on the transaction time, "$t_2$," associated with the transaction location, "$l_2$," and an estimated time of arrival at the destination location 350. The communication initiation subsystem 116 may consider various factors in determining the estimated time of arrival. In some embodiments, the communication initiation subsystem 116 may consider a travel time to the destination location 350 from the transaction location, "$l_2$," which may take into account traffic conditions, speed limits, road conditions, etc., on the way to the destination location 350, a buffer time (e.g., an amount of time in addition to the travel time) to account for any approximations, or other such factors. For example, if the transaction time is "5:30 PM" and the travel time is determined to be at least "45 minutes", the buffer time is "5 minutes," then the estimated time of arrival or the time, t, associated with the occurrence of the location trigger may be determined as at least "5:30"+"45 minutes"+"5 minutes," which is "6:20," or a later time, such as "6:30," "6:40," "6:45," "6:20-6:45," or other times. In some embodiments, the buffer time may be defined an entity associated with the computer system 102 (e.g., administrator or other user).

Figure 4:
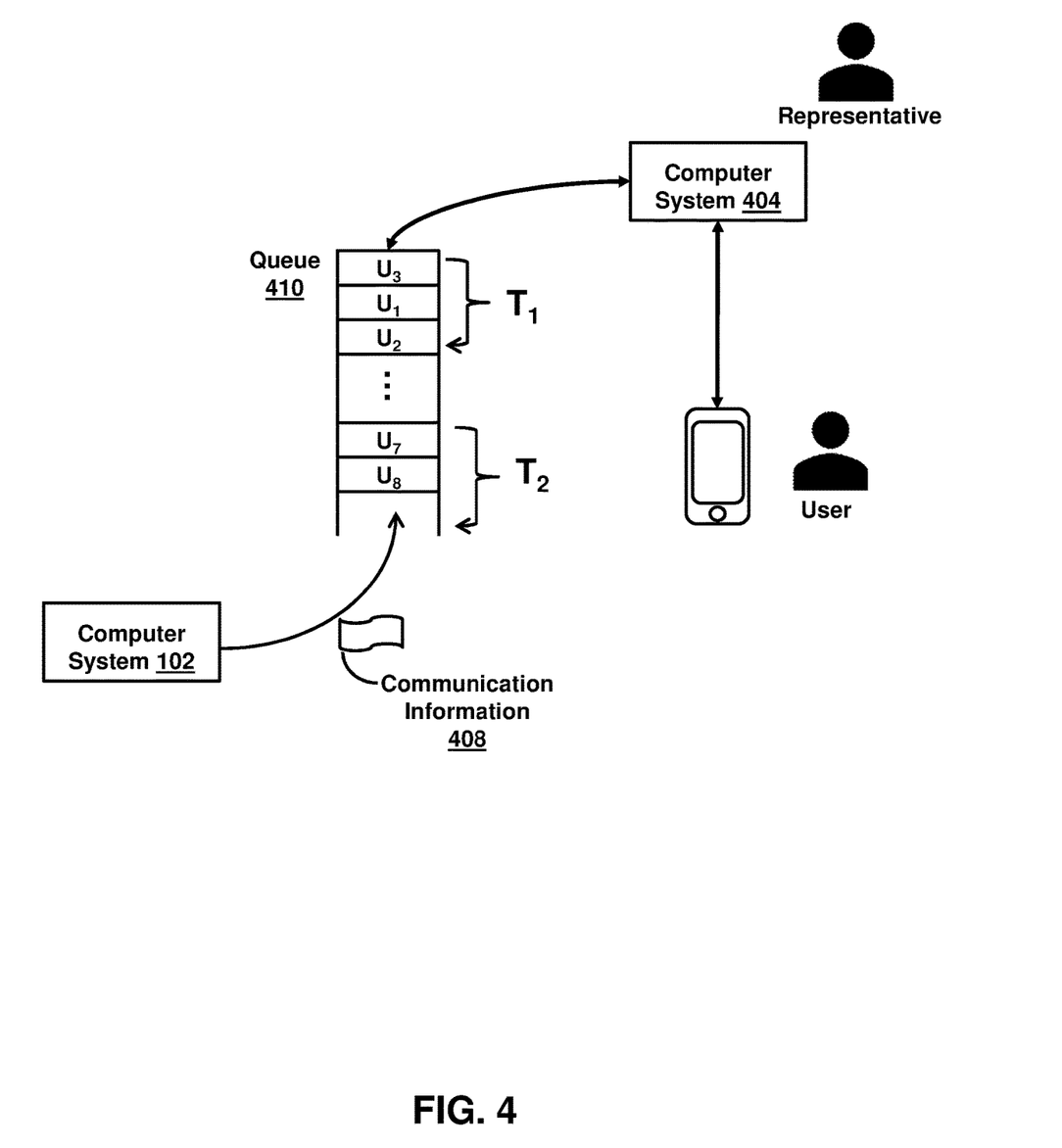
FIG. 4 shows queueing of communication initiations in a communication queue, in accordance with one or more embodiments.

In some embodiments, the communication initiation subsystem 116 may facilitate initiating the communication with the user based on the determined time, t. As illustrated in FIG. 4, the communication initiation subsystem 116 may facilitate initiation of the communication with the user (e.g., call on a mobile device of the user) based on a current time overlapping with the determined time. As an example, the communication initiation subsystem 116 may automatically queue the initiation of communication in a communication queue 410 by inserting communication information 408 (e.g., username, contact information, time for initiating the communication, or other such information) associated with the user in the queue.

The communication queue 410 may order the users based on the time for initiating the communication with the user associated with the earliest time being at the top of the queue. For example, the communication queue 410 groups the users $U_1$-$U_3$ associated with overlapping times T1 and users $U_7$-$U_8$ associated with overlapping times T2. The information regarding the next user in the communication queue 410 (e.g., user $U_3$ from the top of the queue) may be displayed on a computer system 404 associated with a representative, and the representative may then choose to initiate the communication with the user. As another example, the communication initiation subsystem 116 may automatically initiate the communication with the user $U_3$ after the representative completes a current call with another user.

In some embodiments, the communication initiation subsystem 116 may rank the users associated with overlapping times for initiation of communication based on one or more user parameters. In some embodiments, the user parameters that may be used for ranking the users may be defined by an entity associated with the computer system 102, such as a financial institution. As an example, the users may be ranked based on income, account balance in one or more financial accounts, relationship status with the financial institution, time zone in which the user is located, or other parameters. In some embodiments, the communication initiation subsystem 116 may reorder the users with overlapping timeframes in the communication queue 410 based on the rank. For example, in FIG. 4, users $U_1$-$U_3$ associated with overlapping times T1 are ranked in the order of $U_3$, $U_1$ and $U_2$ with user $U_3$ being ranked the highest. Therefore, the communication initiation subsystem 116 may initiate the communication with the user $U_3$ first, then with user $U_1$ and then with user $U_3$.

In some embodiments, if any of the users perform another transaction and the communication initiation subsystem 116 determines that the time associated with occurrence of the location trigger has changed for a particular user, the communication initiation subsystem 116 may update the communication queue 410 by reordering the users in the communication queue 410 based on the updated time of initiation of the communication for the particular user.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 5:
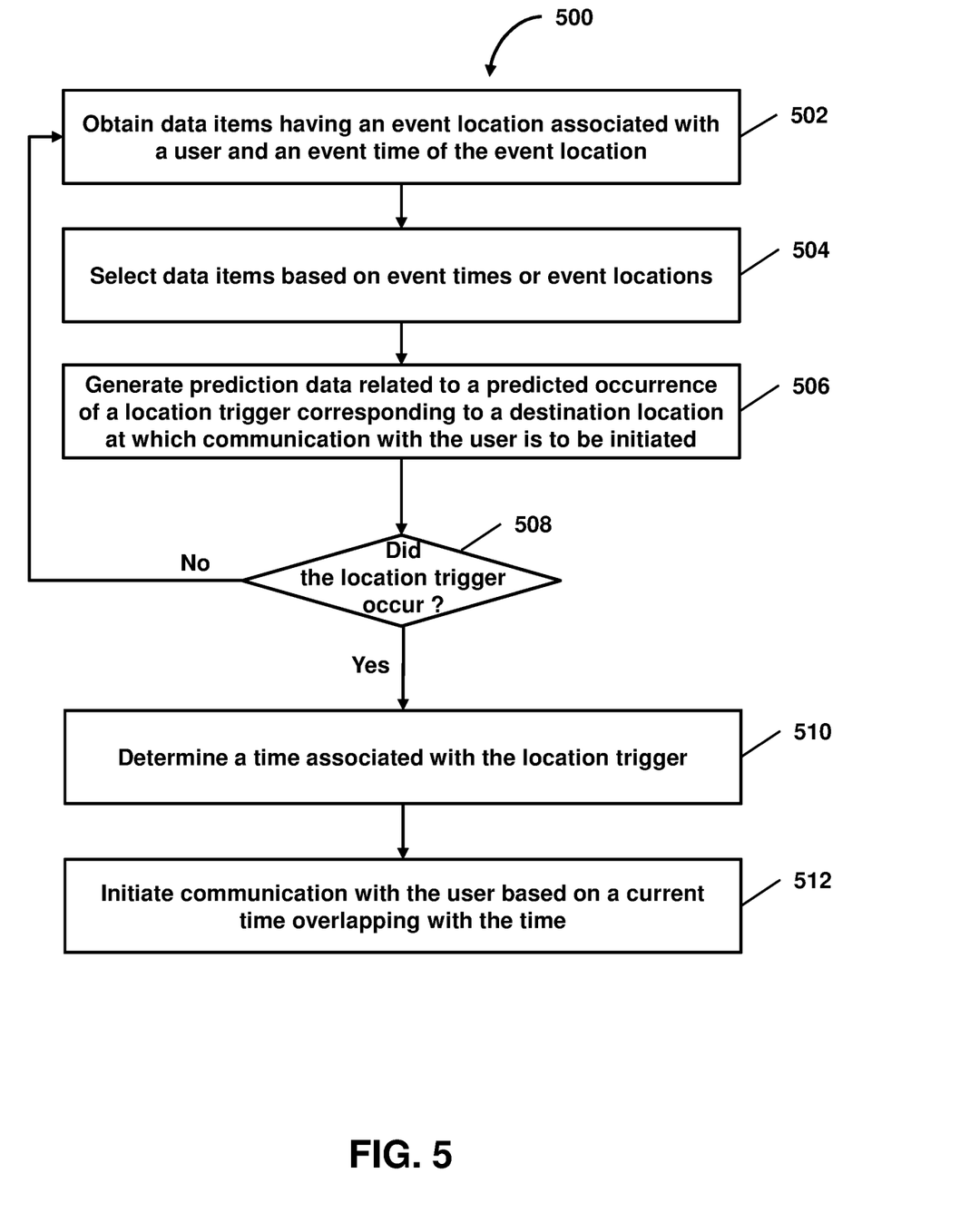
FIG. 5 shows a flowchart of a method of facilitating initiation of location-triggered communication with a user, in accordance with one or more embodiments.

FIG. 5 shows a flowchart of a method 500 of facilitating initiation of location-triggered communication with a user, in accordance with one or more embodiments. In an operation 502, data items having mobile device location-independent location information related to a user is obtained. In some embodiments, a data item may include any event information, such as transaction information related to the user. As an example, data item 302a may include a transaction location of a transaction performed by the user (e.g., at a merchant using a transaction token such as a credit card, debit card, a digital wallet, or other transaction token), transaction time associated with the transaction location, a transaction type (e.g., a merchant category such as groceries, gas, electronics, or other category), or other such information.

Operation 502 may be performed by a component that is the same as or similar to the data management subsystem 114, in accordance with one or more embodiments.

In an operation 504, data items are selected based on transaction location or transaction times. As an example, data items having transaction locations within a specified proximity of a destination location associated with the user is selected. As another example, data items having transaction times within a specified period from a current time (e.g., data item having most recent transaction time) is selected.

Operation 504 may be performed by a component that is the same as or similar to the data management subsystem 114, in accordance with one or more embodiments.

In an operation 506, prediction data related to an occurrence of a location trigger corresponding to a destination location at which the communication with the user is to be initiated is generated. In some embodiments, an occurrence of the location trigger corresponding to the destination location may be indicative of the user performing the transaction corresponding to the selected data item on the way to the destination location (e.g., a home of the user), or may be indicative of the user being available at the destination location in a specified time from the transaction time indicated in the selected data item. In some embodiments, the prediction data may be generated using a prediction model by providing the transaction location, transaction time, transaction type, or other such information from the selected data items as input to the prediction model.

Operation 506 may be performed by a component that is the same as or similar to the communication initiation subsystem 116, in accordance with one or more embodiments.

In an operation 508, a determination of whether the location trigger corresponding to the destination location occurred is made based on the predicted data.

Operation 508 may be performed by a component that is the same as or similar to the communication initiation subsystem 116, in accordance with one or more embodiments.

In an operation 510, responsive to the occurrence of the location trigger, a time associated with the location trigger is determined. In some embodiments, the time associated with the location trigger is indicative of a time, t, (e.g., or a time frame) the user is likely to be available at the destination location for initiating the communication. In some embodiments, the time, t, may be determined based on the transaction time in the selected data item and a travel time from the transaction location in the selected data item to the destination location.

Operation 510 may be performed by a component that is the same as or similar to the communication initiation subsystem 116, in accordance with one or more embodiments.

In an operation 512, a communication is initiated with the user based on a current time overlapping with the determined time. In some embodiments, the communication is initiated with the user by calling the user on a mobile device of the user at the determined time.

Operation 512 may be performed by a component that is the same as or similar to the communication initiation subsystem 116, in accordance with one or more embodiments.

Figure 6:
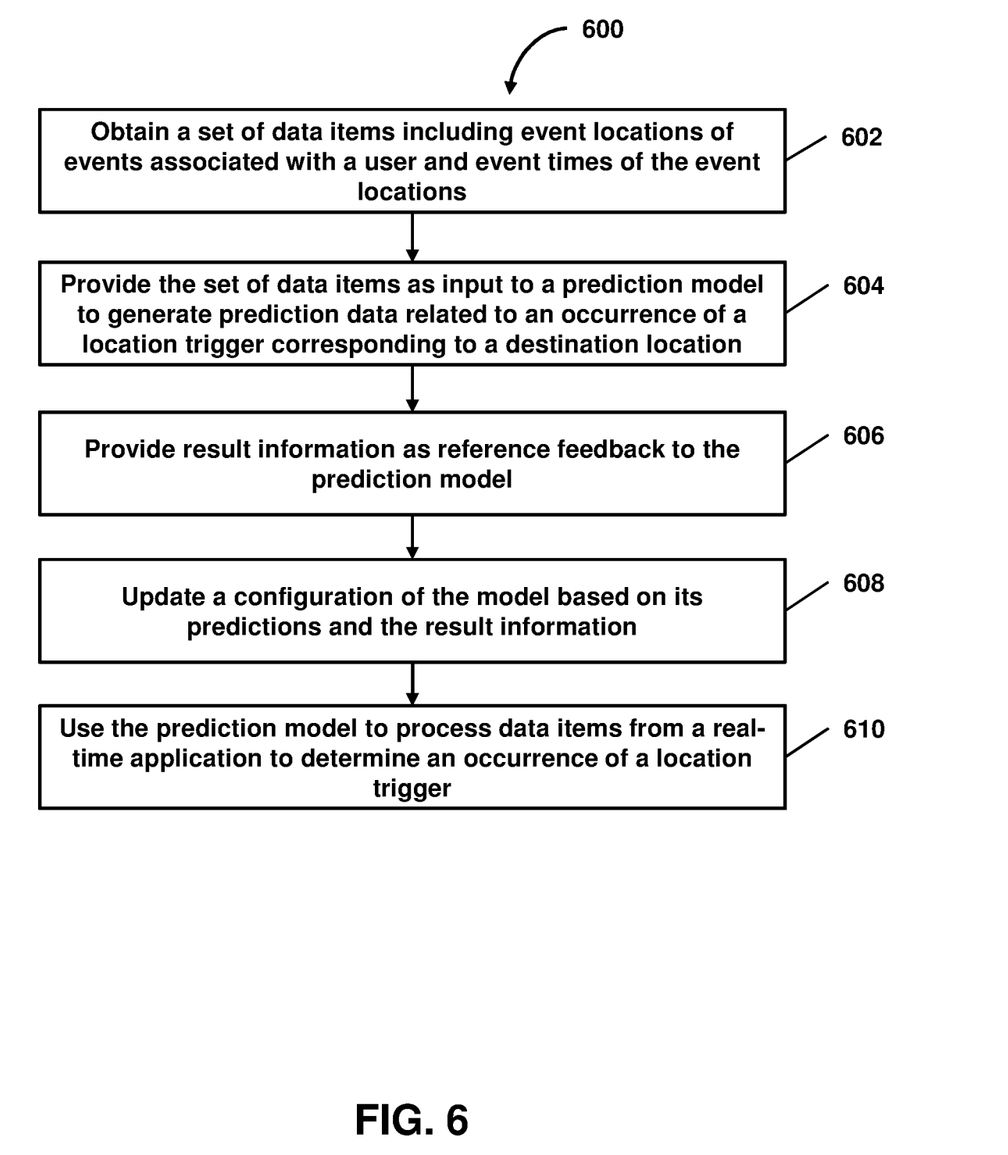
FIG. 6 shows a flowchart of a method of facilitating automatic location-triggered communication initiation via a prediction model, in accordance with one or more embodiments.

FIG. 6 shows a flowchart of a method 600 of facilitating automatic location-triggered communication initiation via a prediction model, in accordance with one or more embodiments. In an operation 602, a set of data items associated with the user may be obtained. In some embodiments, a data item may include transaction information related to the user, such as transaction location, transaction time associated with the transaction location, transaction type, or other such information.

Operation 602 may be performed by a subsystem that is the same as or similar to model subsystem 118, in accordance with one or more embodiments.

In an operation 604, the set of data items may be provided as input to a prediction model to generate predictions. As an example, the predictions may be related to an occurrence of a location trigger corresponding to a destination location at which the communication with the user is to be initiated. Operation 604 may be performed by a subsystem that is the same as or similar to model subsystem 118, in accordance with one or more embodiments.

In an operation 606, result information may be provided as reference feedback to the prediction model. As an example, the result information may be related to whether the location trigger occurred (e.g., actual data related to whether the transaction corresponding to the data item based on which the prediction is generated is performed by the user on the way to destination location from the transaction location). Operation 606 may be performed by a subsystem that is the same as or similar to feedback subsystem 120, in accordance with one or more embodiments.

In an operation 608, the prediction model assesses its predictions against the result information and may update its configurations (e.g., weights, biases, or other parameters) based on its assessment of the predictions. Operation 608 may be performed by a subsystem that is the same as or similar to feedback subsystem 120, in accordance with one or more embodiments.

In an operation 610, subsequent to the updating of the prediction model, the prediction model may be used to predict an occurrence of a location trigger based on a data item received from a real-time application and initiate a communication with the user based on the predicted occurrence of the location trigger. As an example, a data item including transaction information related to the user, such as transaction location, transaction time associated with the transaction location, transaction type, or other such information, may be obtained and provided as input to the prediction model to obtain one or more predictions from the prediction model. The predictions obtained from the prediction model may be used to determine whether an occurrence of the location trigger corresponding to a destination location at which the communication is to be initiated with the user, determine the time associated with the location trigger, and automatically initiate the communication with the user. Operation 610 may be performed by a subsystem that is the same as or similar to communication initiation subsystem 116, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining data items, wherein the data items comprise a data item indicating (i) an event location independent of a device location of a mobile device of a user and (ii) an event time associated with the event location; predicting an occurrence of a location trigger based on the data items, the location trigger corresponding to a destination location at which communication is to be initiated with the user; and initiating the communication with the user based on a time associated with the location trigger.
2. The method of embodiment 1, wherein the data items are obtained from one or more real-time applications.
3. The method of any of embodiments 1-2, wherein the prediction is obtained using a prediction model that is trained using multiple data items associated with the user to predict the occurrence of the location trigger.
4. The method of any of embodiments 1-3, wherein the occurrence of the location trigger is indicative of an event associated with event location happened on the way to the destination location.
5. The method of any of embodiments 1-4, wherein the occurrence of the location trigger is indicative of the user being likely available at the destination location a specified time after the event time.
6. The method of any of embodiments 1-5, wherein predicting the occurrence of the location trigger includes predicting the occurrence of the location trigger based on the event time, the event location, or an event type of an event corresponding the data item.
7. The method of any of embodiments 1-6, wherein predicting the occurrence of the location trigger includes predicting the occurrence of the location trigger based on one of the data items having the most recent event time.
8. The method of any of embodiments 1-7, wherein predicting the occurrence of the location trigger includes predicting the occurrence of the location trigger based on one of the data items having the event location within a specified proximity of the destination location.
9. The method of any of embodiments 1-8, wherein the time associated with location trigger is indicative of a time for initiating the communication with the user at the destination location.
10. The method of any of embodiments 1-9, wherein the time associated with location trigger is determined based on the event time and a travel time from the event location to the destination location.
11. The method of any of embodiments 1-10, wherein initiating the communication with the user includes initiating a call to a mobile device of the user based on the time.
12. The method of any of embodiments 1-11, wherein initiating the communication with the user includes presenting user information related to the user to a representative based on the time; and initiating the communication in response to receiving a user selection of the initiation from the representative.
13. The method of any of embodiments 1-10, wherein initiating the communication with the user includes automatically queuing the initiation of the communication in a queue.
14. The method of embodiment 13, further comprising: obtaining user information of a specified user from the top of the queue; and automatically initiating the communication with specified user based on a current time overlapping with time.

15. The method of embodiment 14, further comprising: automatically initiating the communication with specified user based on a current time overlapping with time and after a representative completes a current call with another user.

16. The method of any of embodiments 1-15, wherein initiating the communication includes: obtaining a new data item, which is more recent than the data items; determining a revised time for initiating the communication with the user based (a) a new event time that is later than a most recent event time of the data items and (b) a new event location that is different from the event locations of the data items; and initiating the communication based on the revised time.

17. The method of any of embodiments 1-16, further comprising: obtaining times for initiation of communication with multiple users, wherein the timeframes are overlapping; and adjusting an order of the initiation of communication with the multiple users based on one or more user parameters.

18. The method of any of embodiments 1-17, wherein the event location corresponds to a location and the event time corresponds to a time of a transaction performed by the user using a transaction token at a merchant.

19. A tangible, non-transitory, machine-readable media storing instructions that, when executed by an apparatus, cause the apparatus to effectuate operations comprising those of any of embodiments 1-17.

20. A system comprising: one or more processors; and memory storing instructions that, when executed by the processors, cause the processors to effectuate operations comprising those of any of embodiments 1-17.

What is claimed is:

1. A system for overcoming lack of mobile device location data to initiate location-triggered communication with a user, the system comprising:
 a computer system comprising one or more processors programmed with computer program instructions that, when executed, cause operations comprising:
  storing a set of location triggers, wherein the set of location triggers comprises a location trigger associated with a user, the location trigger corresponding to a destination location at which communication is to be initiated with the user;
  obtaining, from a data feed, a data stream comprising data items associated with the user, wherein each data item of the data items indicates (i) an event location independent of a device location of a mobile device of the user and (ii) an event time associated with the event location, wherein the data feed is configured to obtain the data items from one or more real-time applications;
  extracting one or more data items from the data stream based on (i) proximity of the device-location-independent event locations of the one or more data items to the destination location and (ii) the event times associated with the device-location-independent event locations;
  providing the one or more extracted data items and a travel time from the event location to the destination location to a machine learning model to predict occurrence of the location trigger;
  determining a timeframe associated with the location trigger based on the predicted occurrence of the location trigger; and
  automatically queuing initiation of the communication with the user based on a current time overlapping with the timeframe.

2. The system of claim 1, wherein determining the timeframe includes:
 obtaining a first data item of the one or more data items, wherein the first data item is associated with (a) a first event time that is later than a most recent event time of the one or more data items and (b) a first event location that is different from the event locations of the one or more data items;
 determining a revised timeframe associated with the location trigger based on the first data item; and
 adjusting the initiation of the communication with the user based on the revised timeframe.

3. The system of claim 1, wherein automatically queuing initiation further includes:
 obtaining timeframes for initiation of communication with multiple users, wherein the timeframes are overlapping; and
 adjusting an order of the initiation of communication with the multiple users based on one or more user parameters.

4. A method comprising:
 storing a set of location triggers, wherein the set of location triggers comprises a location trigger associated with a user, the location trigger corresponding to a destination location at which communication is to be initiated with the user;
 obtaining data items from a data storage, wherein each data item of the data items indicates (i) an event location independent of a device location of a user device of a user and (ii) an event time associated with the event location, wherein the data storage is configured to store the data items received from a real-time application;
 determining one or more data items from the data items based on the event times associated with the event locations;
 generating, via a prediction model, prediction data related to a predicted occurrence of the location trigger based on the one or more data items;
 determining a timeframe associated with the location trigger based on the prediction data related to the predicted occurrence of the location trigger; and
 initiating the communication with the user based on a current time overlapping with the timeframe.

5. The method of claim 4, wherein determining the one or more data items includes:
 determining a data item based on a most recent event time.

6. The method of claim 4, wherein determining the one or more data items includes:
 determining a data item based on a most recent event location being within a specified proximity of the destination location.

7. The method of claim 6, wherein the specified proximity is adjusted based on the destination location.

8. The method of claim 4, wherein generating the prediction data includes:
 determining, based on a data item of the one or more data items, that the user is on the way to the destination location from the event location.

9. The method of claim 8, wherein determining the timeframe includes:
 determining the timeframe based on a travel time from the event location to the destination location.

10. The method of claim 4, wherein initiating the communication includes:
   automatically queuing the initiation of the communication with the user.

11. The method of claim 4, wherein initiating the communication includes:
   obtaining a first data item from the data storage, wherein the first data item is associated with a first event time that is later than a most recent event time of the one or more data items and a first event location that is different from the event locations of the one or more data items;
   determining a revised timeframe associated with the location trigger based on the first data item; and
   adjusting the initiation of the communication with the user based on the revised timeframe.

12. The method of claim 4, further comprising:
   obtaining timeframes for initiation of communication with multiple users, wherein the timeframes are overlapping; and
   adjusting an order of the initiation of communication with the multiple users based on one or more user parameters.

13. The method of claim 4, wherein generating the prediction data includes:
   obtaining a first data item of the one or more data items, wherein the first data items is associated with a first event location and a first event time; and
   generating the prediction data based on the first event location and the first event time.

14. The method of claim 13, further comprising:
   generating the prediction data based on a first event type associated with the first data item.

15. The method of claim 4, wherein obtaining the data items includes:
   obtaining, by the real-time application, the data items from a computer system that generates the data items in response to an event performed by the user.

16. A non-transitory computer-readable medium comprising instructions that, when executed by one or more processors, cause operations comprising:
   storing a set of location triggers, wherein the set of location triggers comprises a location trigger associated with a user, the location trigger corresponding to a destination location at which communication is to be initiated with the user;
   obtaining data items from one or more real-time applications, wherein each data item of the data items indicates (i) an event location independent of a device location of a user device of a user and (ii) an event time associated with the event location;
   determining one or more data items from the data items based on the event times associated with the event locations;
   generating, via a prediction model, prediction data related to a predicted occurrence of the location trigger based on the one or more data items;
   determining a timeframe associated with the location trigger based on the prediction data related to the predicted occurrence of the location trigger; and
   initiating the communication with the user based on a current time overlapping with the timeframes.

17. The computer-readable medium of claim 16, wherein the one or more data items are determined based on the event time being within a specified period from the current time.

18. The computer-readable medium of claim 16, wherein the one or more data items are determined based on the event locations being within a specified proximity of the destination location.

19. The computer-readable medium of claim 16, wherein generating the prediction data includes:
   determining, based on the one or more data items, that the user is on the way to the destination location from the event location.

20. The computer-readable medium of claim 16, wherein the operations further comprise:
   obtaining timeframes for initiation of communication with multiple users, wherein the timeframes are overlapping; and
   adjusting an order of the initiation of communication with the multiple users based on one or more user parameters.

* * * * *